June 11, 1963     J. JOHNSON     3,093,312
IRRIGATION SYSTEM DEVICE

Filed Oct. 17, 1962     2 Sheets-Sheet 1

INVENTOR
JOHN JOHNSON

BY Chas. R. Allen
ATTORNEY

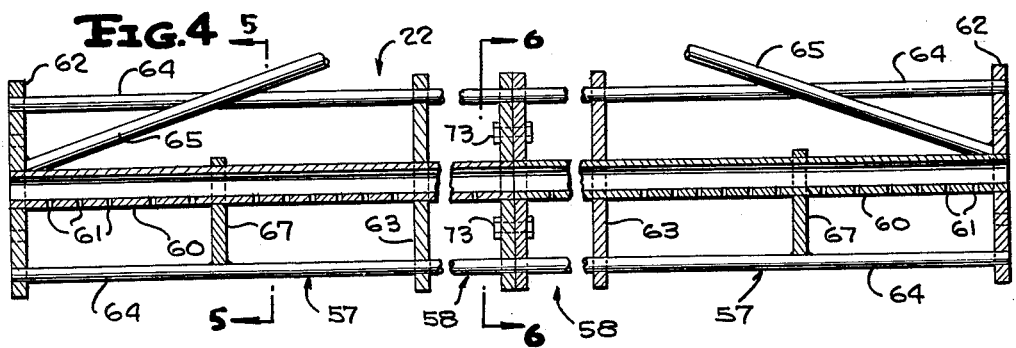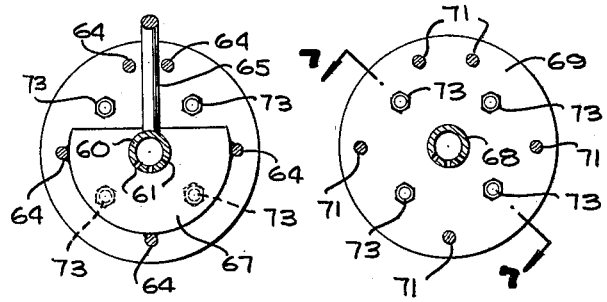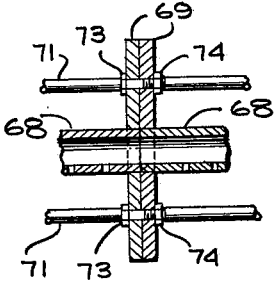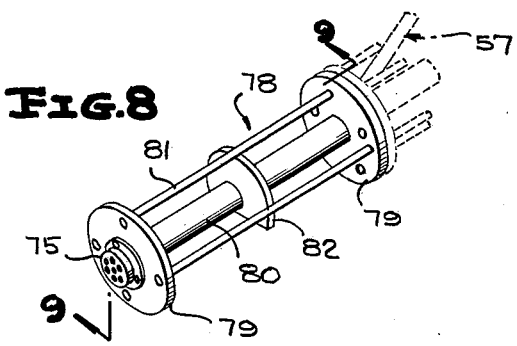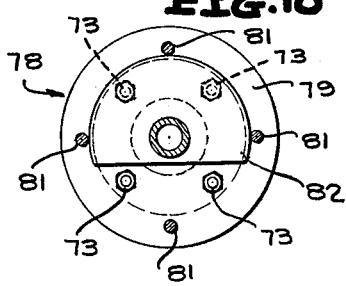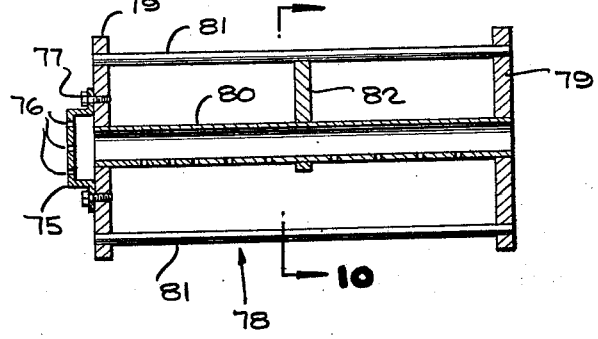

United States Patent Office 3,093,312
Patented June 11, 1963

3,093,312
IRRIGATION SYSTEM DEVICE
John Johnson, 4105 N. McDonald Road,
Spokane 69, Wash.
Filed Oct. 17, 1962, Ser. No. 231,221
4 Claims. (Cl. 239—185)

This invention relates in general to new and useful improvements in irrigation systems, and more particularly to a novel permanent overhead irrigation system.

At the present time, there are two primary forms of irrigation systems for fields, one permanent and the other temporary. In the permanent form of irrigation system, permanent flumes and side ditches must be installed. This not only requires much initial work, but also a large amount of maintenance together with constant control of the flow of the water through the various side ditches. On the other hand, the temporary system utilizing movable sprinkler pipes requires the constant taking up and moving of sprinkler pipes from one area to another until the entire field has been watered.

It is the primary object of this invention to incorporate the desirable features of both of the above-mentioned systems. In accordance with this invention, it is proposed to provide a permanent irrigation system which has all of the advantages of the movability of a sprinkler pipe system.

In accordance with this invention, it is an object thereof to provide an overhead sprinkling system which may be permanently mounted in a field and which will cover a very large area of the field, the irrigation system, while being permanent, being readily adaptable to movement to other localities as crops are being rotated.

Still another object of this invention is to provide a novel irrigation system which utilizes an overhead track supporting a spray boom which is mounted for movement along the track back and forth over a field, and with the spray boom being of a sufficient length to cover a very wide area.

Still another object of this invention is to provide a permanent overhead irrigation system which is very simple and is economical to manufacture and use.

Yet another object of this invention is to provide a permanent overhead irrigation system which requires little or no attention during the operation thereof.

A still further object of this invention is to provide a permanent overhead irrigation system which may utilize spray booms of different lengths whereby the width of the area of a field to be irrigated may be varied in accordance with the irrigation requirements.

Yet another object of this invention is to provide a novel spray boom for use in an overhead irrigation system, the spray boom being formed of a plurality of sections and the sections being readily interchangeable in accordance with the requirements of the irrigation system.

With the above and other objects in view that will hereinafter appear, the nature of the invention will be more clearly understood by reference to the following detailed description, the appended claims and the several views illustrated in the accompanying drawing.

In the drawing:

FIGURE 4 is an enlarged fragmentary longitudinal vertical sectional view taken along the line 4—4 of FIGURE 3 with intermediate portions broken away and shows specifically the details of construction of one of the sections of the spray boom.

FIGURE 5 is an enlarged fragmentary transverse vertical sectional view taken along the line 5—5 of FIGURE 4, and shows the specific details of construction of the spray boom.

FIGURE 6 is an enlarged fragmentary sectional view taken along the line 6—6 of FIGURE 4 and shows further the details of construction of the spray boom.

FIGURE 7 is a longitudinal fragmentary sectional view taken along the line 7—7 of FIGURE 6, and shows the manner in which two spray boom sections may be assembled.

FIGURE 8 is a fragmentary perspective view of one end of the spray boom and shows the manner in which a spray boom section is converted into a terminal section.

FIGURE 9 is an enlarged fragmentary longitudinal sectional view taken along the line 9—9 of FIGURE 8, and shows the specific construction of the terminal spray boom section.

FIGURE 10 is an enlarged fragmentary transverse vertical sectional view taken along the line 10—10 of FIGURE 9 and shows the specific details of the spray boom section.

Figure 1:
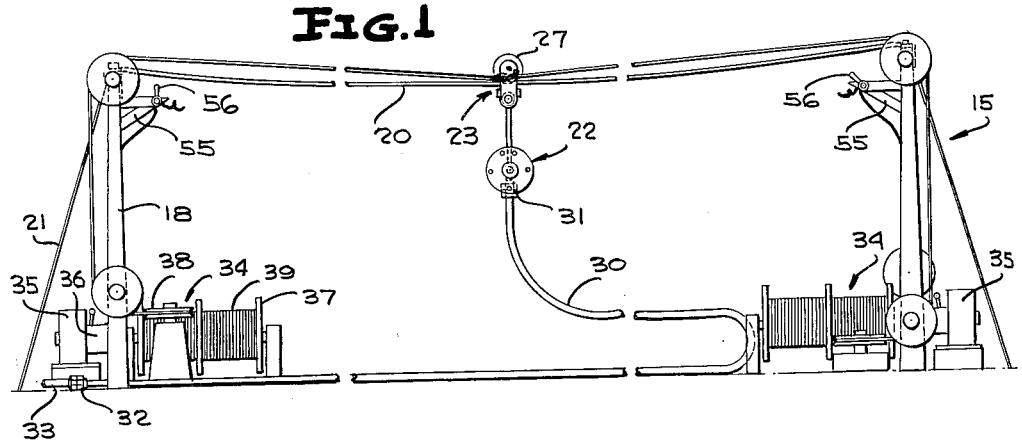
FIGURE 1 is a side elevational view of a permanent overhead irrigation system formed in accordance with this invention, intermediate portions of the system being omitted.
Figure 2:
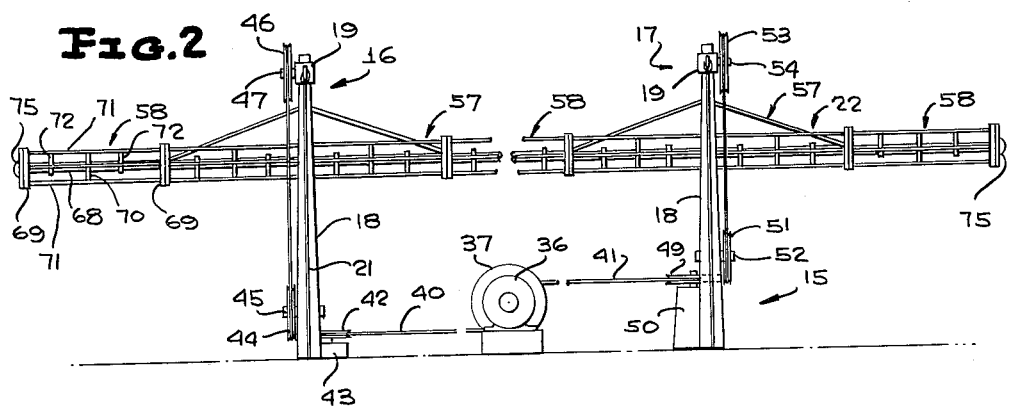
FIGURE 2 is an end elevational view of the irrigation system of FIGURE 1 and shows further the details thereof, intermediate portions of the irrigation system also being omitted.

Referring now to the drawings in detail, reference is first made to FIGURES 1 and 2 wherein the over-all irrigation system is illustrated. The irrigation system is generally referred to by the numeral 15 and is preferably mounted so that it completely extends across a field, either from side to side or from end to end depending upon the specific shape of the field. The irrigation system 15 includes a pair of parallel track assemblies 16 and 17. Each of the track assemblies 16 and 17 includes a pair of uprights or posts 18 disposed at opposite ends or opposite sides of the field to be irrigated. The posts 18 are suitably mounted in the ground and are provided at the upper ends thereof with fittings 19. A flexible track 20 extends between the fittings 19 of a pair of posts of each of the track assemblies 16 and 17. The flexible track 20 is preferably in the form of a cable. Each post 18 is suitably braced by means of a guy wire 21 which is secured at its upper end to a respective one of the fittings 19 and at its lower end is suitably anchored in the ground.

Figure 3:
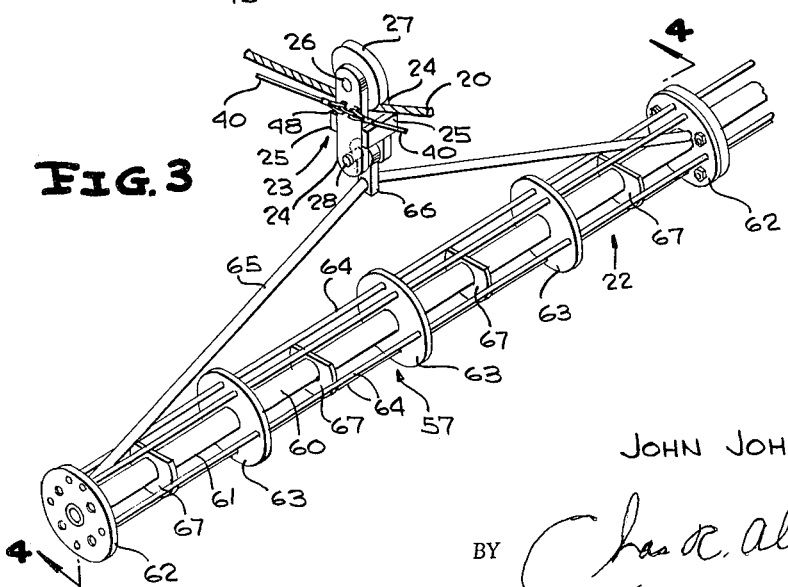
FIGURE 3 is an enlarged fragmentary perspective view showing a portion of the spray boom and the manner in which the spray boom is mounted on an overhead cable type track for movement back and forth across a field to be irrigated.

The irrigation system 15 also includes a spray boom, generally referred to by the numeral 22. The spray boom 22 extends transversely of the tracks 20 and is suitably suspended therefrom. The details of the spray boom 22 will be set forth hereinafter. However, the spray boom 22 is suspended from each of the tracks 20 by means of a hanger, generally referred to by the numeral 23. With reference to FIGURE 3, it will be seen that each hanger 23 includes a pair of side plates 24 which are suitably secured together by means of transverse bars 25. A shaft 26 extends between the upper ends of the plates 24 and has a wheel 27 rotatably journaled thereon between the plates 24. A spray boom support pin 28 extends between the lower ends of the plates 24. It is to be noted that the wheel 27 is contoured to ride upon the associated track 20.

Water is supplied to the spray boom 22 by means of a flexible hose 30 which is connected to a central portion of the spray boom 22 by means of a fitting 31. The hose 30 lies on the ground for the most part and is attached by means of a fitting 32 to a water supply pipe 33 which may be disposed at one side or one end of the field to be irrigated. It is to be understood that the spray boom 22 traverses back and forth between the post 18 and at all times at least one-half of the hose 30 rests upon the ground. Only that portion of the hose 30 which is elevated by the spray boom 22 remains off of the ground.

The traversing of the spray boom 22 is effected by means of a pair of drive units 34 which are disposed at opposite ends of the tracks 20. Each drive unit 34 includes a power unit 35, which is preferably in the form of an electric motor but may be in the form of an internal combustion engine. A clutch assembly 36 is connected to each of the power units 35 and couples the same to a multiple drum 37 which includes drum sections 38 and 39. A cable 40 is entrained on the drum section 38 while a cable 41 is entrained on the drum section 39. It is to be noted that the cables 40 and 41 are fed onto the drum sections from opposite directions so that the cable 40 is low while the cable 41 is high and the cables extend in opposite directions. The cable 40 extends around a horizontal pulley 42 which is mounted on a suitable support 43 and then around a lower vertical pulley 44 which is carried by a shaft 45 projecting from the bottom portion of the associated post 18. An upper vertical pulley 46 is mounted on a shaft 47 which extends outwardly from the respective fitting 19 in alignment with the pulley 44. The ends of the cables 40 are connected to the hanger 23 by means of a suitable fitting 48, as is best shown in FIGURE 3.

Each cable 41 passes around a horizontal pulley 49 which is carried by a suitable ground mounted support 50. The cable 41 then passes around a vertical pulley 51 mounted on a shaft 52 carried by a lower portion of the associated post 18. The cable 41 then passes over an upper vertical pulley 53 which is aligned with the lower pulley 51 and is journaled on a shaft 54 carried by the associated post fitting 19. The ends of the cables 41 are connected to the other of the two hangers 23.

Referring now to FIGURE 1, it will be seen that one post 18 at each end of the irrigation system 15 is provided with a bracket 55 on which there is mounted a limit switch 56 engageable by a portion of the respective hanger 23. The limit switches 56 are interconnected and are connected to the clutches 36 for controlling the operation of the same. Also, when the power units 35 are electric motors, they may be utilized for the purpose of controlling the energization thereof. For example, when the spray boom 22 is moving from left to right, as viewed in FIGURE 1, the right hand power unit 35 will be energized and the left hand clutch 36 will be released so that the drum 37 is free to rotate. If the power units 35 are electric motors, the electric motor at the left end of the irrigation system 15 will also be de-energized. When the spray boom 22 reaches the right end of its travel, the operations of the power units and clutches at the opposite ends of the irrigation system 15 will be reversed to effect the automatic return traversing of the spray boom 22 without an attendant performing any operating functions so that the irrigation system 15 is automatic.

The spray boom 22 is of a novel construction and is formed in a plurality of sections so that the irrigation system 15 may be modified to meet the particular requirements of the field to be irrigated. The spray boom 22 is formed of a plurality of sections which include main sections 57 and auxiliary sections 58. There is one main section 57 for each of the tracks 20 and the main sections 57 are trussed sections.

Reference is now made to FIGURE 3 wherein there are illustrated the details of one of the main spray boom sections 57. The spray boom section 57 includes a spray pipe 60 which is provided throughout its length with a plurality of spray openings or spray nozzles 61, as desired. At the opposite ends of the spray pipe 60 there are positioned plates 62 in the form of connector plates. The plates 62 are circular for reasons to be described hereinafter. The spray pipe 60 is also provided with a plurality of intermediate plates 63 which are also circular. A plurality of reinforcing rods 64 extend between the plates 62 and through the plates 63. The reinforcing rods 64 are anchored at the plates 62. The reinforcing rods 64, as is illustrated in FIGURE 5, include two upper parallel reinforcing rods, a lower reinforcing rod, and two oppositely disposed reinforcing rods. The truss member 65 extend upwardly from the end plates 62 and has the central portion thereof connected to a strap 66 which is mounted on the pin 28. It is to be noted that the ends of the truss member 65 are securely attached to the spray pipe 60 and end portions of the truss member 65 pass between the two uppermost reinforcing rods 64.

In order to further reinforce the spray boom section 57, the spay pipe 60 is provided with generally semicircular reinforcing plates or gussets 67 intermediate the plates 62 and 63. Each of the plates 67 is suitably secured to the spray pipe 60 and is attached to the three lower ones of the reinforcing rods 64.

Each of the auxiliary sections 58 includes a spray pipe 68 which corresponds to the spray pipe 60. At the opposite ends of each of the auxiliary sections 58 there is disposed a circular mounting plate which corresponds to the plate 62 of the main sections 57. Depending upon the length of an auxiliary section 58, there may be one or more intermediate circular plates 70 which correspond to the plates 3. A plurality of reinforcing rods 1, which are arranged in the same manner as the reinforcing rods 64, extend between and are anchored at the plates 69. The reinforcing rods 71 are braced by gussets 72 which correspond to the gussets 67.

Referring now to FIGURES 4, 6 and 7, it will be seen that there are illustrated the details of a typical connection between a pair of the auxiliary sections 58. The opposed ends of the auxiliary spray boom sections 58 are disposed in alignment with the end plates 69 thereof in face-to-face engagement. The end plates 69 are secured together by a plurality of bolts 73 which extend through the plates 69 and have nuts 74 thereon. The spacing of the bolts 73 is clearly shown in FIGURE 6. It is to be understood that the auxiliary spray boom sections 58 are secured to the ends of the main spray boom sections 57 by similar connections between the plates 62 and 69. These connections provide communication between the respective spray pipes 60 and 68.

Although the auxiliary spray boom sections 58 at the center and the ends of the spray boom 22 are of identical construction, it is to be understood that the bending forces thereon are different. As a result, while the auxiliary spray boom sections 58 disposed at the center of the spray boom 22 are oriented in the same manner as are the main spray boom sections 57, the terminal spray boom sections 58 are rotated 180 degrees so that the two adjacent reinforcing rods 71 thereof are disposed lowermost and the gussets 72 are disposed uppermost.

It is to be understood that the spray boom 22 is designed to spray not only that portion of a field over which it directly traverses, but also outwardly thereof. To this end, there is mounted on the end of each of the terminal spray boom sections a nozzle 75. A typical nozzle construction is illustrated in FIGURE 9. Each nozzle 75 overlies the open end of an associated spray pipe and is provided with spray apertures 76 through which water may pass. The orientation of the spray apertures 76 may vary as is desired. The nozzle 76 is secured in place by means of suitable fasteners 77.

Although it is desirable to specially reinforce the auxiliary spray boom sections 58 when the spray boom 22 is of a very great length, this is not necessary when the spray boom is relatively short. Accordingly, there is illustrated in FIGURES 8, 9 and 10 a slightly modified form of auxiliary spray boom section which is generally referred to by the numeral 78. The spray boom section 78 includes a pair of terminal plates 79 which are circular in outline and which correspond to the plates 62. A spray pipe 80 extends between and is secured to the plates 79 in sealed relation. A plurality of equally circumferentially spaced reinforcing rods 81 extend between the plates 79 and are terminally secured thereto. Intermediate portions of the reinforcing rods 81 are braced by a gusset 82 which is mounted on the spray pipe 80. As in the case of the terminal auxiliary spray boom sections 58, the terminal auxiliary spray boom sections 78 will also be provided with the nozzles 75.

From the foregoing, it will be readily apparent that there has been devised a highly desirable irrigation system which may be readily permanently mounted at opposite ends or opposite sides of a field and which will automatically function to irrigate the field. Also, it will be readily apparent that the construction of the irrigation system is such that its initial cost is relatively low and the operational cost is held to a minimum. At the same time, the irrigation system is flexible in that the over-all length of the spray boom may be varied and it is possible to seasonally move or adjust the irrigation system as desired.

Although only a preferred embodiment of the invention has been illustrated and described herein, it is to be understood that minor modifications may be made therein within the spirit and scope of the invention, as defined by the appended claims.

I claim:

1. An irrigation system comprising a pair of widely spaced elongated parallel tracks, a spray boom suspended from said tracks and projecting to opposite sides thereof, and means at opposite ends of said tracks for moving said spray boom back and forth along said tracks, said spray boom being formed in sections and including two truss sections each having a hanger engaged with one of said tracks, and each section including a central spray pipe, terminal plates secured to said spray pipe, reinforcing rods extending between said terminal plates and spaced around said spray pipe, and fillers carried by said spray pipe and bracing said reinforcing rods intermediate said terminal plates.

2. An irrigation system comprising a pair of widely spaced elongated parallel tracks, a spray boom suspended from said tracks and projecting to opposite sides thereof, and means at opposite ends of said tracks for moving said spray boom back and forth along said tracks, said spray boom being formed in sections and including two truss sections each having a hanger engaged with one of said tracks, and each section including a central spray pipe, terminal plates secured to said spray pipe, reinforcing rods extending between said terminal plates, and fillers carried by said spray pipe and bracing said reinforcing rods intermediate said terminal plates, said reinforcing rods being unequally spaced around said spray pipe to brace said sections against bending loads and said terminal plates being of a symmetrical construction whereby said sections may be oriented in accordance with the loading thereon.

3. A spray boom for an irrigation system and having trussed supporting sections and replaceable central and outer sections, and each section including a central spray pipe, terminal plates secured to said spray pipe, reinforcing rods extending between said terminal plates and spaced around said spray pipe, and fillers carried by said spray pipe and bracing said reinforcing rods intermediate said terminal plates.

4. A spray boom for an irrigation system and having trussed supporting sections and replaceable central and outer sections, and each section including a central spray pipe, terminal plates secured to said spray pipe, reinforcing rods extending between said terminal plates, and fillers carried by said spray pipe and bracing said reinforcing rods intermediate said terminal plates, said reinforcing rods being unequally spaced around said spray pipes to brace said sections against bending loads and said terminal plates being of a symmetrical construction whereby said sections may be oriented in accordance with the loading thereon.

References Cited in the file of this patent

UNITED STATES PATENTS

| | | |
|---|---|---|
| 2,226,668 | Newman | Dec. 31, 1940 |
| 2,556,428 | Kooken | June 12, 1951 |
| 2,879,945 | Johnson | Mar. 31, 1959 |
| 2,971,699 | Reiss | Feb. 14, 1961 |

FOREIGN PATENTS

| | | |
|---|---|---|
| 11,159 of 1903 | Austria | Mar. 10, 1903 |